US006360310B1

(12) United States Patent
Au (10) Patent No.: US 6,360,310 B1
(45) Date of Patent: Mar. 19, 2002

(54) APPARATUS AND METHOD FOR INSTRUCTION CACHE ACCESS (75) Inventor: Edmund Au, Sunnyvale, CA (US)

(73) Assignee: NEC Electronics, Inc., Mountain View, CA (US)

(*) Notice: Subject to any disclaimer, the term of this patent is extended or adjusted under 35 U.S.C. 154(b) by 0 days.

(21) Appl. No.: 09/496,786

(22) Filed: Feb. 3, 2000

(51) Int. Cl.[7] .................................................. G06F 9/38
(52) U.S. Cl. ......................... 712/205; 712/219; 712/225
(58) Field of Search .............................. 712/205, 219, 712/225

(56) References Cited

U.S. PATENT DOCUMENTS 4,920,477 A * 4/1990 Colwell et al.
5,708,788 A * 1/1998 Katsuno et al. ............. 712/214

* cited by examiner

Primary Examiner—David L. Robertson
(74) Attorney, Agent, or Firm—Skjerven Morrill MacPherson, LLP; Stephen A. Terrile (57) ABSTRACT

When a processing unit clock cycle period decreases (i.e., the processing unit operating frequency increases) such that the processing unit has only sufficient time to transfer accurately instruction fields from the instruction cache unit, the processing unit does not have sufficient time to determine the address of the next instruction to be retrieved from the instruction cache unit. In order to provide instruction fields to a pipelined processing unit with few breaks in the instruction field stream, the field in the program counter is incremented during to provide a speculative address of a next instruction field during a first clock cycle. During the first clock cycle, the instruction field identified by program counter field is accessed and transferred to the processor. The instruction field helps to determine an actual address of the next instruction field. During a second clock cycle, the instruction field identified by the speculative address generated during the firs clock cycle is accessed and applied to the processor. Also during the second clock cycle, the actual address of the next instruction field is determined and compared with the speculative address generated during the first cycle. When these two addresses are the same, then the instruction field being accessed during the second clock cycle is the correct instruction field and the current address from the second cycle is incremented to become the speculative address for the third clock cycle and the address of the instruction cache to be accessed during a third clock cycle. When the actual address does not equal the speculative address, then the instruction field being accessed during the second clock cycle is canceled. As a result of this comparison, the actual address is used to access the instruction cache field during the third clock cycle and the actual address is incremented during the third clock cycle to provide the speculative address for the fourth clock cycle.

14 Claims, 10 Drawing Sheets

|       | IC | RF    | EX    | DC    | WB    |
|-------|----|-------|-------|-------|-------|
| t=0   |    |       |       |       |       |
| t=1   | t1 |       |       |       |       |
| t=2   | t2 | t1    |       |       |       |
| t=3   | t3 | t2    | t1    |       |       |
| t=4   | t4 | t3    | t2    | t1    |       |
| t=5   | t5 | No-Op | t3    | t2    | t1    |
| t=6   | t6 | t5    | No-Op | t3    | t2    |
| t=7   | t7 | t6    | t5    | No-Op | t3    |
| t=8   | t8 | t7    | t6    | t5    | No-Op |
| t=9   | t9 | t8    | t7    | t6    | t5    |

FIG. 10

APPARATUS AND METHOD FOR INSTRUCTION CACHE ACCESS

BACKGROUND OF THE INVENTION

1. Field of the Invention

The present invention relates to data processing systems, and, more particularly, to the providing of instruction fields to a processing unit. The instruction fields control the processing of the data fields applied to the processing unit. Any delay in receiving the instruction fields can impact the performance of the data processing system.

2. Description of the Related Art

Microprocessor units and systems that use microprocessor units have attained wide-spread use throughout many industries. A goal of any microprocessor system is to process information quickly. One technique that increases the speed with which the microprocessor system processes information is to provide the microprocessor system with an architecture which includes at least one local memory called a cache unit.

Figure 1:
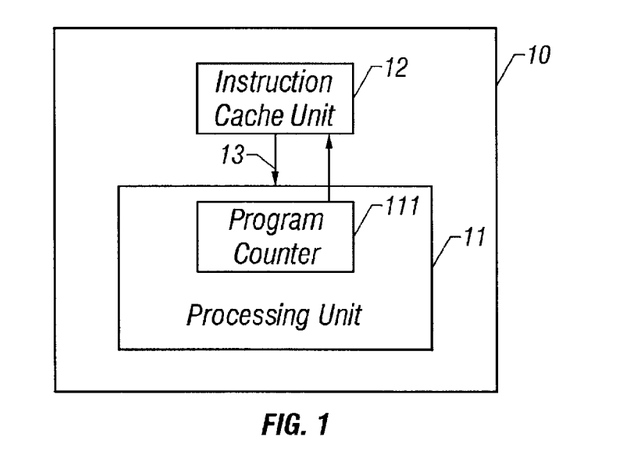
FIG. 1 is block diagram of the portions of a microprocessor system to which the present invention is directed.

A cache unit is used by the microprocessor system to store temporarily instructions and/or data. A cache unit that stores both instructions and data is referred to as a unified cache; a cache unit that stores only instructions is an instruction cache unit and a cache unit that stores only data is a data cache unit. Providing a microprocessor architecture with a unified instruction and data cache or with an instruction cache and a data cache is a matter of design choice. Both data and instructions are represented by data signal groups or fields. In the following discussion, the relationship of the instruction cache unit with the processing unit will be emphasized. Referring to FIG. 1, a microprocessing system 10 displaying the components that are important to the present discussion is shown. A microprocessing system 10 includes a processing unit 11 and an instruction cache unit 12. The processing unit 11 performs operations under control of instructions or instruction fields retrieved from the instruction cache unit 12. The processing unit 11 and the instruction cache unit 12 are coupled by a bus 13 over which the instruction fields are transferred to the processing unit 11. The processing unit 11 includes a program counter 111 that determines the instruction cache unit location that is currently being accessed, the accessed locations in the instruction cache unit storing instruction fields required by the processing unit 11. Thus, the program counter fields determine which instruction cache unit locations are to be accessed. The program counter fields are therefor addresses or address fields for the instruction cache unit 12. In the following discussion, the term program counter number and program counter address fields will be used interchangeably to mean location values in the program counter unit.

In order to increase the performance of the microprocessor systems in the past, the clock cycle period, the basic unit of time for the operations performed by the microprocessor system, has been decreased. At some point, the individual processing operations could no longer be performed within a single clock cycle. In order to decrease further the clock cycle period, the technique of pipelining the microprocessor system and, in particular, the processing unit, was developed. In pipelining a microprocessor, an operation was divided into a plurality of sub-operations, each sub-operation requiring approximately the same amount of time. Because each sub-operation required less time, the clock cycle period could be further reduced, thereby increasing the performance. This increase in performance is accomplished at the expense of increased complexity of the microprocessor resulting from the partitioning of a single operation into a plurality of sub-operations. As a result of the pipelining procedure, sequence of sub-operations can be completed at the lower clock cycle period, even though the total operation itself requires a longer period of time to be completed.

Figure 2A:
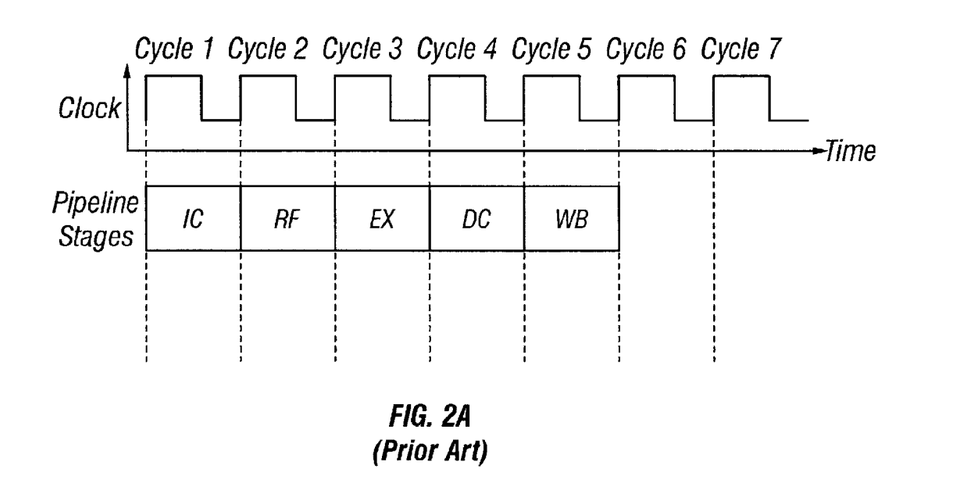

Referring to FIG. 2A, an example of a five stage pipeline for the execution of an instruction by a processing unit is shown. As above, the interaction between the processing unit and the instruction cache unit is emphasized. During clock cycle 1, an access of the instruction cache unit (labeled IC in FIG. 2A) is performed. During clock cycle 2, the instruction field decode and register file read (RF) operations are executed. During clock cycle 3, the activity of the execution (EX) pipeline stage is performed. During clock cycle 4, the data cache access (DC) operation is executed. And during clock cycle 5, the update register file (UB) operation is executed. As is clear from FIG. 2A, each pipeline stage requires one clock cycle to accomplish the operations assigned thereto. These operations are actually sub-operations of activity of the processing unit that was formerly performed in its entirety in one clock cycle. When the processor clock frequency goes up, the cycle time is reduced. Therefore, an execution of an activity of a pipeline can be completed during each of the reduced clock cycle periods. However, the total time to complete the activity of the pipeline is greater than the original time to execute the activity without the pipeline architecture.

Figure 2B:
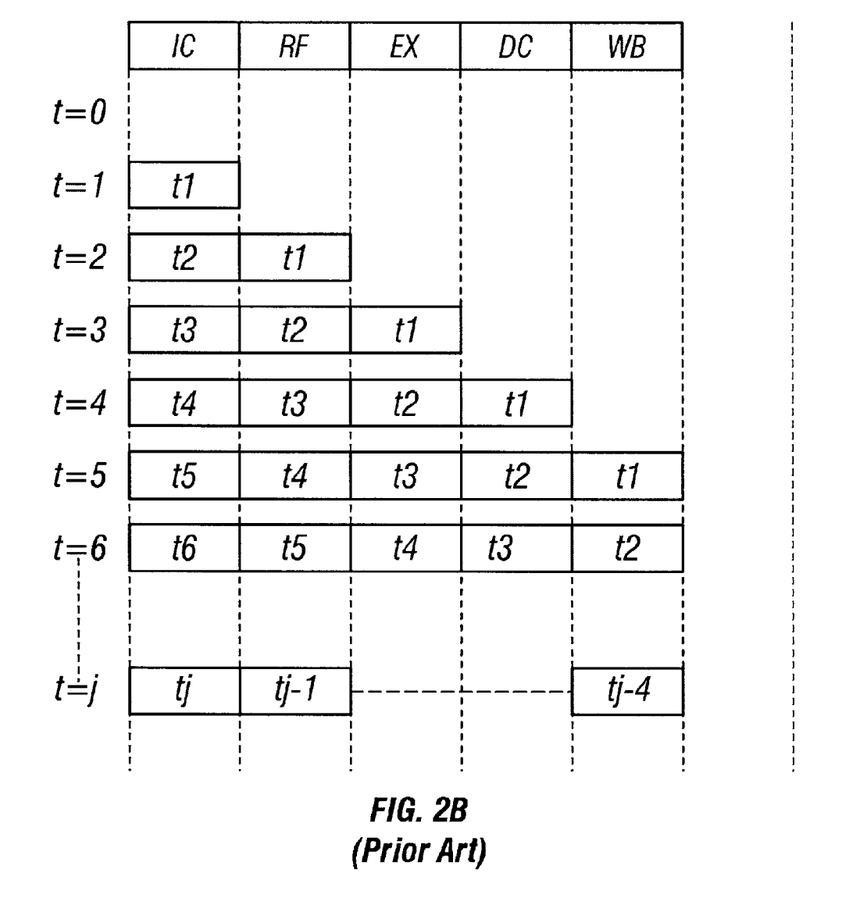
FIG. 2B illustrates the progress of the execution of an instruction in the pipelined processing unit illustrated in FIG. 2A.

Referring to FIG. 2B, the typical flow of instruction execution in a five stage pipeline, according to the prior art is shown. For each clock cycle, the implementation of another instruction is begun. At t (clock cycle)=1, instruction I1 begins execution in the IC pipeline stage. At t (clock cycle)=2, instruction I1 is being implemented in the RF pipeline stage, while the next instruction I2 is being executed in the IC pipeline stage. At t (clock cycle)=3, instruction I1 is being executed in the EX pipeline stage, instruction I2 is being executed in the RF pipeline stage, and instruction I3 has begun execution in the IC pipeline stage. The progress of the instructions is illustrated in FIG. 2B until at t (clock cycle)=5, instruction I1 is being executed in the last WB pipeline stage. At t (clock cycle)=6, instruction I1 has completed execution and is no longer being executed in the processor unit. At t (clock cycle)=j, the instruction Ij is being executed in the first or IC pipeline stage, instruction Ij-1 is being executed in the RF pipeline stage, instruction Ij-2 is being executed in the EX pipeline stage, instruction Ij-3 is being executed in the DC pipeline sage and instruction Ij-4 is being executed in the WB pipeline stage.

As can be seen from FIG. 2A and FIG. 2B, the pipelined processor can complete the execution of an instruction every clock cycle. The clock cycle time is typically much shorter than the time to execute the instruction in a non-pipelined processor. However, this performance benefit has a performance penalty, the performance penalty being the (5 clock cycle) delay before the first instruction is completed and the completion of the execution for each clock cycle can begin. This delay is typically referred to as the (5 cycle) latency of the pipeline. The latency can provide an obstacle to achieving the full execution performance of the pipelined processing unit.

Figure 3:
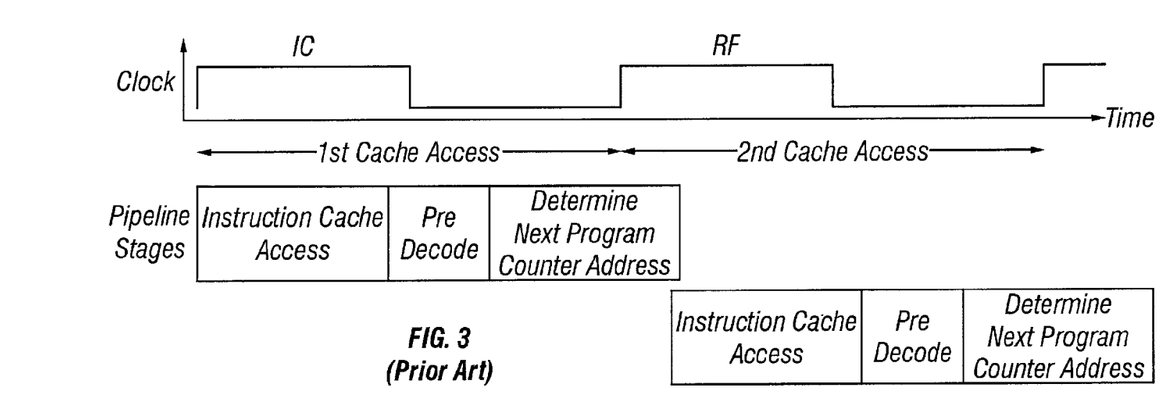
FIG. 3 illustrates the activity that is performed during the first clock cycle of a pipelined processor according to the prior art.

The subdividing of the processing unit into pipeline stages can increase the performance of the processing unit. However, in each clock cycle, a plurality of operations are performed. For example, referring to FIG. 3, during the first pipeline (IC) stage, three separate sub-sub-operations are performed. First, the correct location in the instruction cache unit must be accessed and the instruction field stored therein transferred to the processing unit. Then the processing unit performs a decoding operation on a predecode subfield of the transferred instruction filed. The predecode subfield is an instruction field component assisting in the determination of the next program counter (NPC) address. This program counter address identifies the location of the next instruction field. Thus, this activity must be completed before the beginning of the second (RF) clock cycle, because the next instruction field must be accessed and transferred during the second clock cycle as shown in FIG. 3.

As the clock cycle period is further decreased, problems in the foregoing pipelined operation became apparent. For example, the transfer of the instruction field can only be shortened by a limited amount. Any attempt to further reduce this time results in inaccuracies in the identification of the logic signals transferred on the bus 13 in FIG. 1. Similarly, decoding the predecode subfield of the transferred instruction field, even though only a partial decoding of the instruction field, requires a certain amount of time and, if the clock cycle becomes too short, this amount of time is insufficient for determine the next program counter address.

Figure 4:
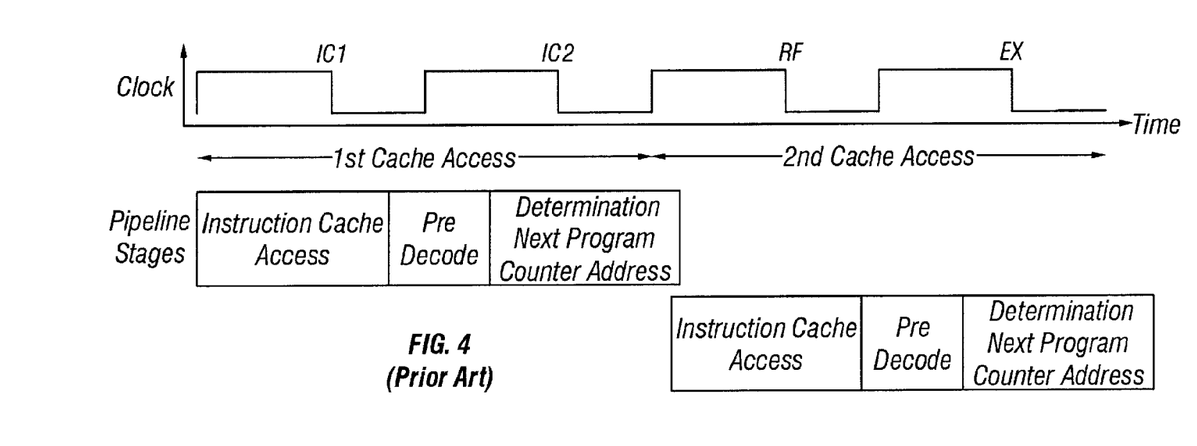
FIG. 4 illustrates a technique for reducing the clock cycle period while still performing the operations of the first clock cycle in FIG. 3 according to the prior art.
Figure 5:
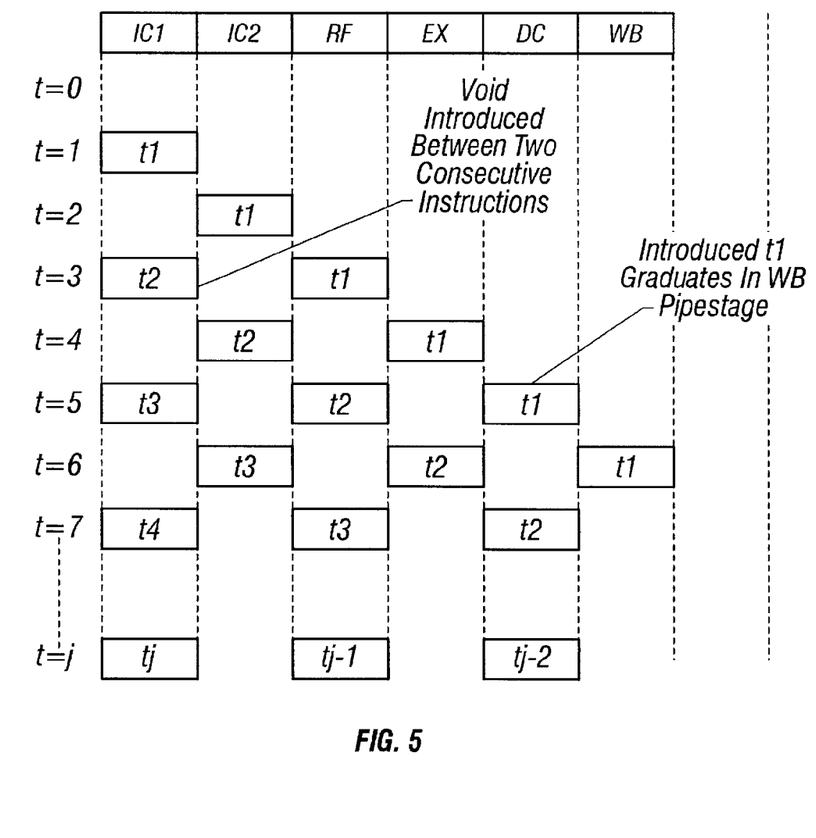
FIG. 5 illustrates the disadvantage of providing a processing unit pipeline structure shown in FIG. 4.

Referring to FIG. 4, one solution, according to the related art, to the amount of activity needed to be performed during the IC clock cycle is shown in FIG. 4. As shown in FIG. 4, the IC pipeline stage shown in FIG. 2A is subdivided into two stages, labeled IC1 and IC2. The first IC1 sub-pipeline stage, in response to the address field from the program counter, transfers an instruction field to the processing unit. Because an entire clock cycle is devoted to this transfer, the transfer of the instruction field to the processing unit should be unambiguous. During the second IC2 subpipeline stage, the decoding of the predecode subfield of the instruction field and the generation of the next program counter field is completed. This solution to the problem provides that the correct next program counter address is determined in a timely fashion. However, this solution does have an unacceptable result. This result is illustrated in FIG. 5. As can be seen in FIG. 5, each and every stage of the pipeline performs an operation during a clock cycle and has no activity to perform on the following clock cycle. In other words, the performance of the processing unit has been decreased by 50%.

A need has been felt for apparatus and an associated technique for transferring the instruction fields from the instruction cache unit to the processing unit at a more rapid clock rate than previous pipelined processing units. The apparatus and associated technique should have the feature that voids in the pipelined execution of instructions would be minimized.

SUMMARY OF THE INVENTION

The aforementioned and other features are accomplished, according to the present invention, by dividing the instruction cache access and the next program counter field computation into two independent activities. However, both activities are performed during the same processor clock cycle. A speculative next program counter address is calculated by incrementing the current program counter address during a current instruction cache access. This speculative address takes advantage of the fact that program instructions are generally arranged in sequential order. The speculative program counter address is available for identifying the next sequential instruction cache access. The speculative program counter address is applied to program counter and the corresponding instruction field is accessed during the next clock cycle. During the current instruction cache access, the processing unit begins decoding the predecode subfield of the instruction field that was retrieved from the instruction cache during the previous clock cycle. The decoding and other apparatus determines the actual (correct) next program counter address. Thus, during the clock period when the speculative next program address brought forward from the previous clock period is accessing an instruction field, the decoding and other apparatus are determining whether the speculative program counter address is the correct program counter address. After determination of the actual program counter address, this actual program address is compared to the next program counter address from the previous clock cycle, the next program counter address from the previous clock cycle determining the instruction cache field accessed during the current clock cycle. When the comparison is true, then the address of the instruction cache memory unit being accessed is correct and the procedure is allowed to continue. In particular, the next program counter address from the previous clock cycle is now the current program counter field and this current program counter field is incremented to provide the next program counter address field for the next clock cycle. When the comparison is false, the current access to the instruction cache unit is in error and the instruction cache access is canceled. In addition, the actual program counter address becomes the next program counter address, thereby determining the access to the instruction cache unit during the next clock cycle

BRIEF DESCRIPTION OF THE DRAWINGS

The present invention may be better understood, and its numerous objects, features, and advantages made apparent to those skilled in the art by referencing the accompanying drawings.

FIG. 2A illustrates the division of the activity of the processing unit into pipelined stages according to the prior art, while

DETAILED DESCRIPTION OF THE PREFERRED EMBODIMENT(S)

Detailed Description of the Figures

Figure 6A:
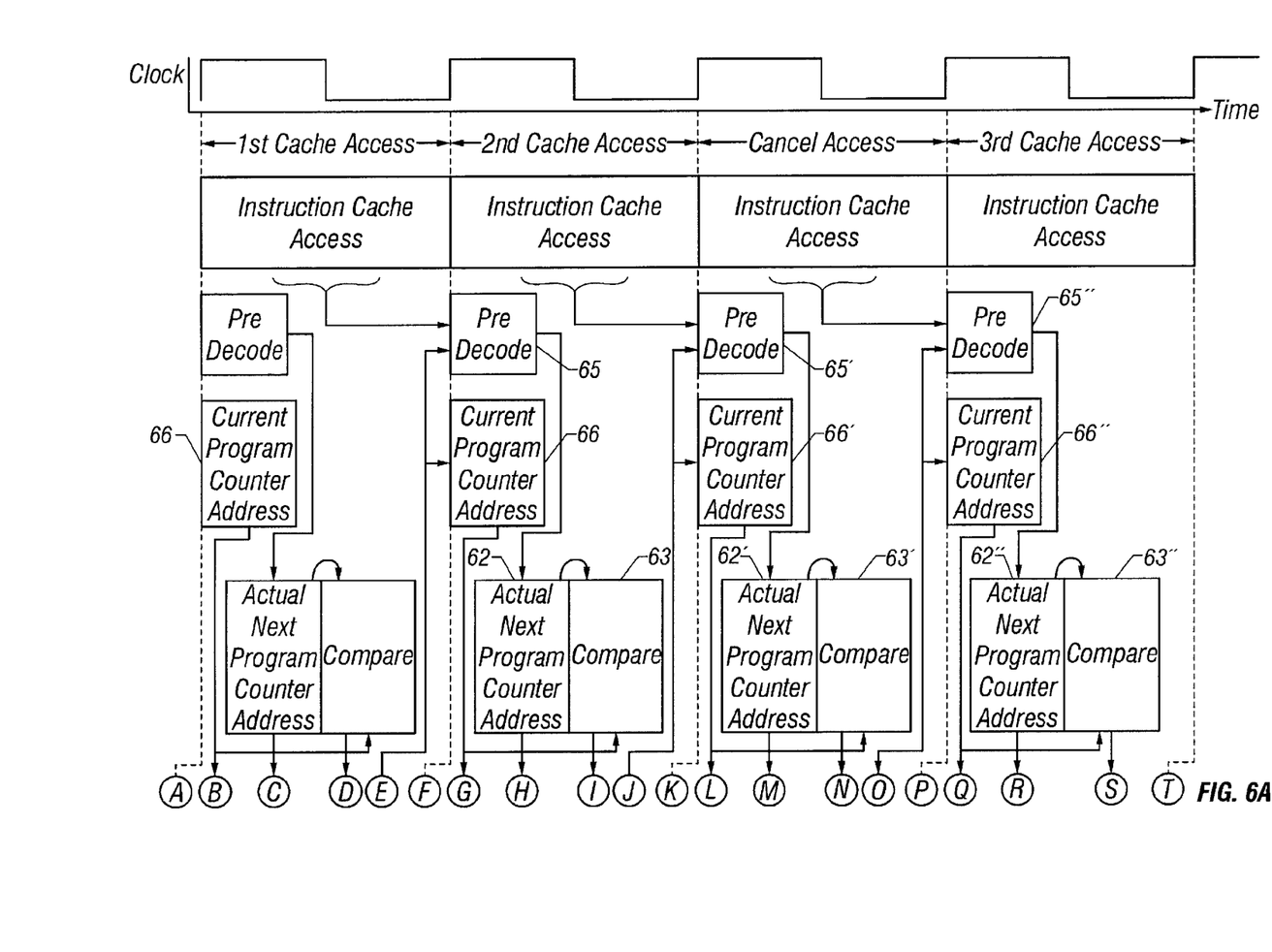
FIG. 6 illustrates the technique for accessing the instruction cache unit in a pipelined environment according to the present invention.
Figure 6B:
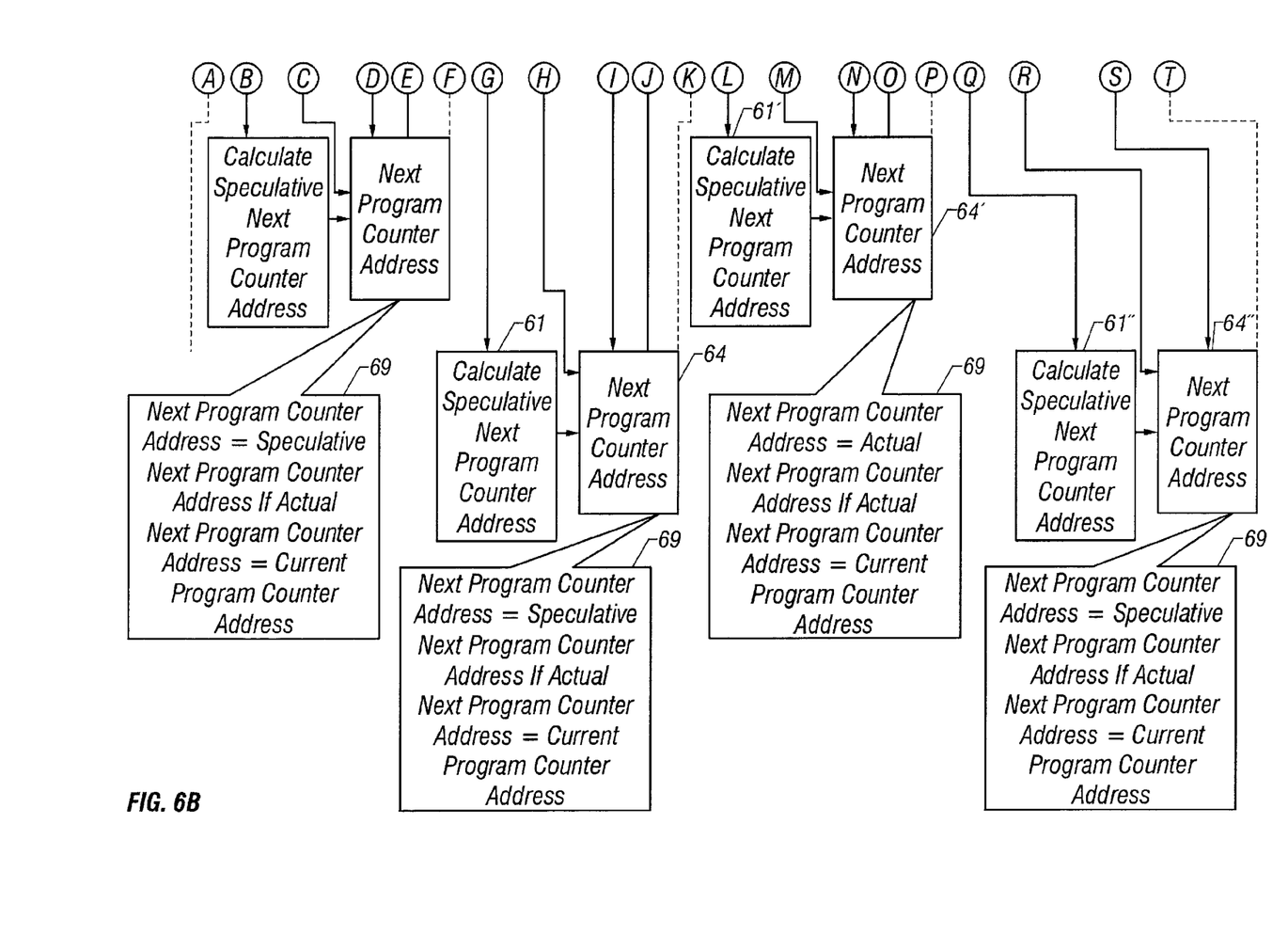

Referring to FIG. 6, the procedure by which the next program counter address for the instruction cache is generated is illustrated. For purposes of explanation, the activity of the second, the third and the fourth clock cycle will be emphasized. As shown in FIG. 6, during the second cycle, a speculative next program counter address is determined in procedure 61. In procedure 62, an actual next program counter address is determined (in a manner that will be described below). This actual next program counter address is compared to the current program counter address stored in procedure 66. The current program counter address in procedure 66 comes either from the speculative next program from the previous clock cycle or from the actual next program counter address from the previous generated in response to an instruction retrieved in the previous clock cycle. The current program counter address during clock cycle 2 in FIG. 6 is derived from the speculative next program counter address from clock cycle 1. Depending on the result of the compare procedure 63, the speculative next program counter address from procedure 61 or the actual next program counter address from procedure 62 is selected for procedure 64. The procedure 64 determines which of the next program counter address, i.e., the speculative next program counter address or the actual next program counter address, is applied to both the instruction cache and to procedure 66', procedure 66' being the storage in the third clock cycle of the current program counter address derived from the speculative next program counter address generated in the second clock cycle. As indicated by procedure 69, the next program counter address in procedure 64 comes from the speculative next program counter address generated in the second clock cycle. During the second clock cycle, an instruction field is transferred to the processor from the instruction cache unit. The instruction field that was retrieved from the instruction cache unit during the second clock cycle has a predecode procedure 65' performed thereon. The predecode procedure 65' includes decoding the predecode subfield and helps in determining the actual next program counter address which is stored in procedure 62', and, depending on the result of compare procedure 63' can be stored in procedure 64'. The next program counter address from procedure 64 becomes the current program counter address in procedure 66' during the third clock cycle. Thus, the current program counter address in procedure 66' in the third clock cycle is the input signal that generates the speculative next program counter address in procedure 61' during the third clock cycle. This speculative next program counter address from procedure 61' can be retained in procedure 64' depending on the result of the compare procedure 63'. The actual next program counter address generated in the third cycle in procedure 62', is compared in procedure 63' with the current program counter address (66') in the third clock cycle The current counter address, stored in procedure 66' in clock cycle 3, comes from the speculative next program counter address from procedure 61 generated in the second clock cycle. As a result of that comparison 63', the next program counter address is equal to the actual program counter address because the actual program counter address is not equal to the current program counter address (66') in the third clock cycle as shown in procedure 69'. Note that the speculative next program counter address from the second clock cycle is, by the foregoing discussion, the current program counter value in procedure 66' in the third clock cycle, i.e., the address of the instruction cache currently being accessed. Therefore, the current or third clock cycle access of the instruction cache is canceled, the instruction cache being accessed at the address, i.e., speculative next program counter address generated in the second clock cycle is not correct. The instruction cache address that should have been accessed is now accessed in the fourth clock cycle and the speculative next program counter address in the fourth clock cycle is applied to the next program counter address to predict the address for the fifth clock cycle (not shown).

Figure 7:
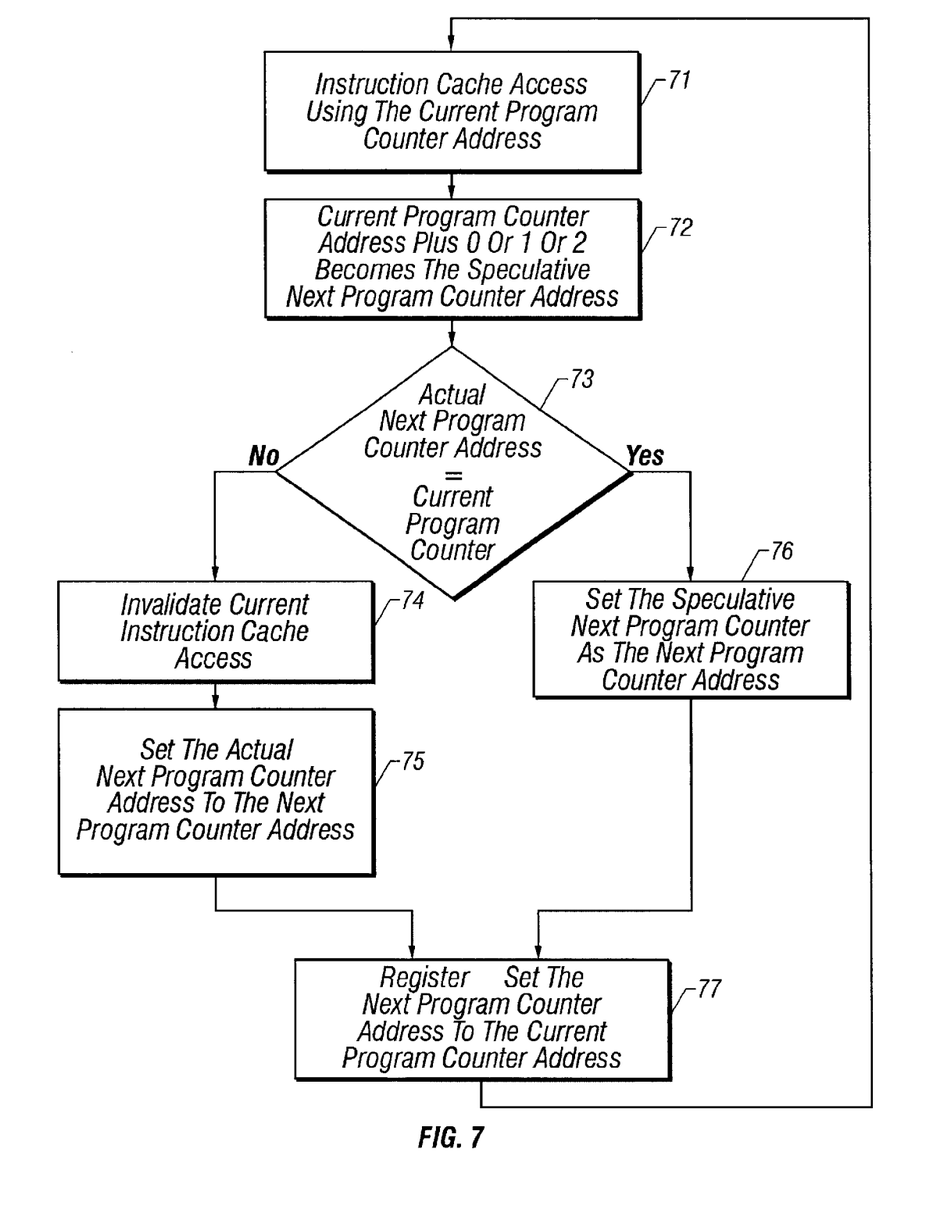
FIG. 7 is a flow chart illustrating the accessing of the instruction cache unit according to the present invention.

Referring to FIG. 7, a flow diagram of the present invention is shown. In step 71, the instruction cache is accessed using the current program counter address. In step 72, the speculative next program counter address is generated by adding 0 or 1 or 2 to the current program address. The current program counter address is compared to the actual next program address in step 73. When the comparison is true, then in step 76, the next program counter address is set equal to the speculative next program counter address. In step 77, the next program counter address is placed in the current program counter. If, however, in step 73 the actual next program counter address is not equal to the current program address, then, the current instruction cache access is invalidated in step 74. In step 75, the actual next program counter address becomes the next program counter address. After step 75, the procedure returns to step 77 and the next program counter address becomes the current program address.

Figure 8:
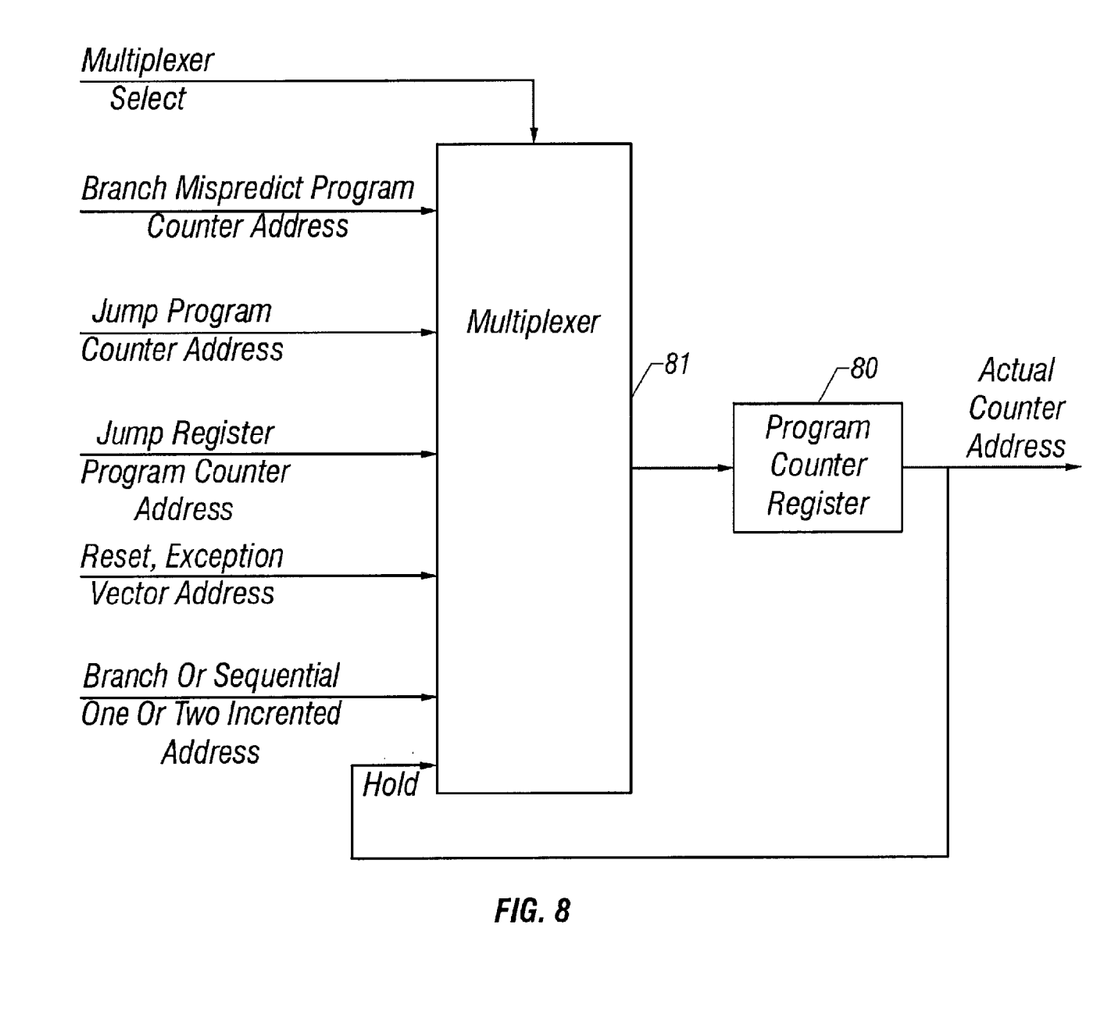
FIG. 8 illustrates one embodiment for generating the actual next program counter address according to the present invention.

Referring to FIG. 8, an embodiment for determining the actual program counter address is shown. The output of multiplexer 81 is applied to program counter register 80. The output of the program counter register 80 is applied to a hold input terminal of the multiplexer 81 and provides the actual next program counter address. The multiplexer 81 has several input signals applied to input terminals. These input signals include branch misprediction of the program counter address (i.e., the branch prediction is incorrect), a jump program counter address; a jump register program counter address, a reset or exception vector address; and a branch address or sequential +1 or +2 incremented address. The output signal of the multiplexer 81 is determined by a multiplexer select signal.

Figure 9:
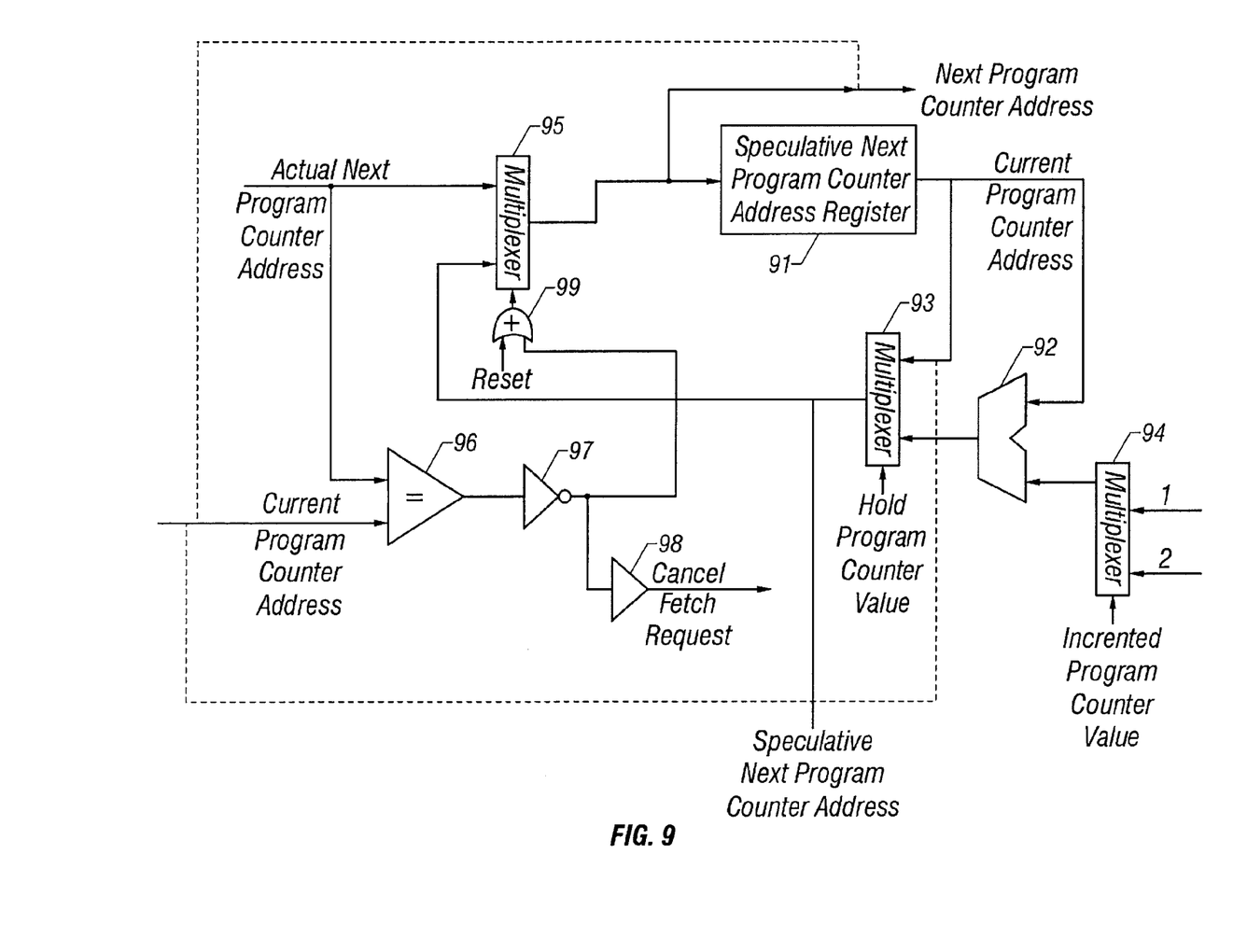
FIG. 9 is a block diagram of one embodiment for implementing instruction cache accesses according to the present invention.

Referring to FIG. 9, the apparatus implementing the present invention is shown. The current program counter address is generated from the output terminals of the next program counter address register 91. The current program counter address is applied to a first set of input terminals of adder 92 and to a first set of terminal of multiplexer 93. The second set of input terminals of multiplexer 93 is coupled to the output terminals of adder 92. A second set of terminals of adder unit 92 receive the output signals of multiplexer unit 94. A first set of input terminals of multiplexer unit 94 receives a numeric "1" signal, while the second set of input terminal of multiplexer unit 94 receives a numeric "2" signal. A control signal (INCREMENT PROGRAM COUNTER VALUE) determines which of the two numeric signals is applied to the second set of input terminals of the adder unit 92. The selection of the input signals by multiplexer 93 is determined by the control signal HOLD PROGRAM COUNTER VALUE. The output terminal of multiplexer 93 is applied to a second set of input terminals of multiplexer 95. The actual next program counter address is applied to a first set of terminals of multiplexer 95 and the actual next program counter address is applied to a first set of terminals of comparator 96. The second set of input terminals of comparator 96 has the current program counter address applied thereto. The output terminal of the comparator 96 is applied through inverting amplifier 97 to the first set of input terminals of 2-input logic OR. gate 99 and to the input terminal of operational amplifier 98. The second set of input terminals of 2-input logic OR gate 99 has the RESET signal applied thereto. The output terminal of logic OR gate 99 is coupled to the control input terminal of multiplexer 95. The output terminal of operational amplifier 98 is a CANCEL FETCH REQUEST signal.

Figure 10:
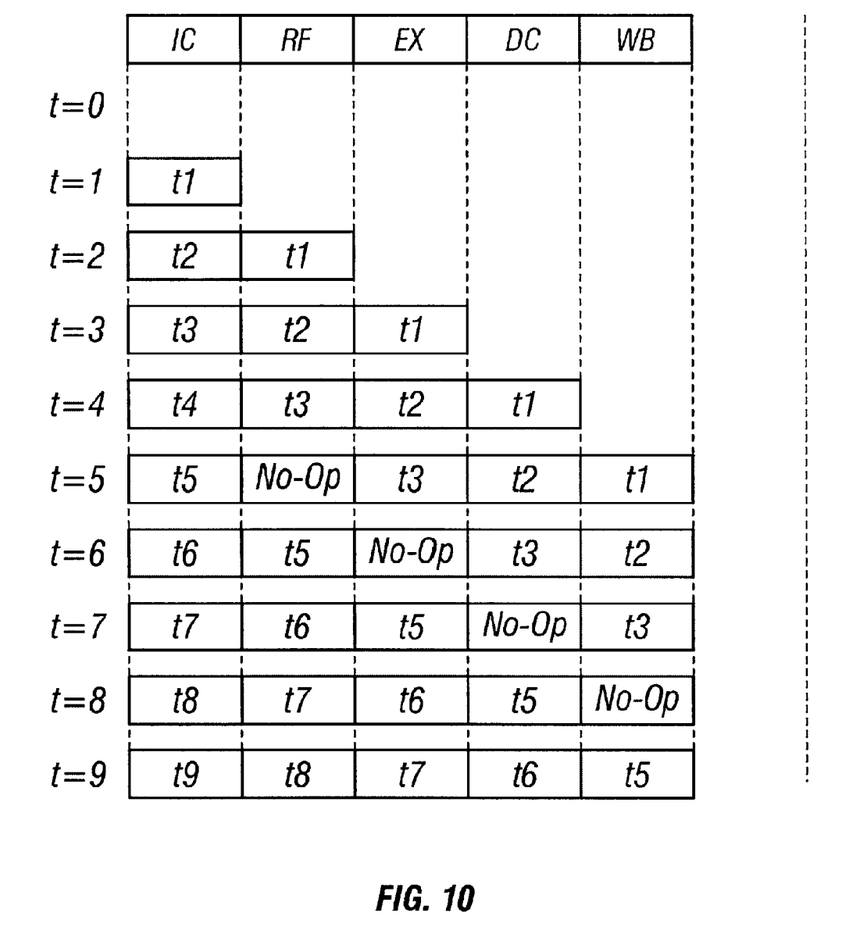
FIG. 10 illustrates the activity of stages of the processor pipeline wherein a incorrect instruction field has been retrieved from the instruction cache unit according to the present invention.

Referring to FIG. 10, the operation of the stages of a processor pipeline are shown for the situation wherein the speculative address has (i.e., speculative next program counter address was in error is shown. In FIG. 10, at clock cycle, t=3, instruction (field) 13 in the instruction cache unit is accessed and transferred to the processing unit. During clock cycle=3, the instruction cache address of instruction I3 is incremented to provide the address of instruction I4. During clock cycle=4, the instruction I4 is transferred to the processor unit. However, also during the clock cycle=4, the instruction I3 is being decoded. In particular, the actual or correct address of the next sequential instruction field is determined in the present example to be instruction I5, and not I4, I4 being currently transferred to the processor unit. Once the processor unit determines that the instruction I4 has been accessed in error, then any further activity by the processing unit involving instruction I4 is canceled and the instruction field I5 is transferred to the processor unit during clock cycle=5. During clock cycles=5, 6, 7 and 8, each portion of the pipeline that would have processed the instruction I4 has a no-operation associated therewith. Thus, the present invention provides a series of no-operations during the transition from a retrieval of a first group of sequential instruction fields to a second group of sequential of instruction fields.

Operation of the Preferred Embodiment(s)

The present invention can be understood in following manner. The pipelining of the processing unit does not permit the incoming instruction field to be decoded and the next program counter address to be determined in a timely manner. In fact, the IC clock cycle has just enough time to transfer the instruction field to the processing unit. In order to avoid not having a instruction field applied to the processor during the next cycle, a speculative decision is made based on the fact that instructions are typically stored in consecutive order. Therefore, the most likely next instruction field will be the instruction field having the next consecutive address identified in the program counter. Therefore, the address in the program counter can be incremented to the next program counter address. This address is speculative because a multiplicity of situations can arise wherein the required next instruction field is not accessed by the next sequential address in the program counter. The input signals to the multiplexer 81 in FIG. 8 summarizes several of these situations. Nonetheless, sequential addressing of the instruction cache unit, and hence incrementing the program counter, is the typical procedure. The program counter unit is then incremented, during the next clock cycle, the instruction cache is accessed at the speculative program counter address. While the instruction field from instruction cache unit identified by the speculative address is being transferred to the processing unit, the processing unit is decoding the predecode subfield of the instruction field accessed in the previous clock cycle and determining the actual next program counter address. That is, each instruction field helps to identify the next instruction field, but this next instruction field can not be determined by the processor during the clock cycle that the instruction field is being transferred to the processing unit. Instead, the actual next program counter address is determined during the next clock cycle, the clock cycle during which the instruction field identified by the speculative program counter address is being transferred to the processing unit. During this next clock cycle, not only is the actual program counter address (from the instruction field) being determined, but this actual program counter address is compared with the current program counter address, i.e., the next program counter address from the previous clock cycle. (This next program counter address is set to either the speculative next program counter address or the actual next program counter address depending on the comparison result.) When these two addresses are the same, then the next program counter address from the previous clock cycle is the correct address and the procedure continues. However, when the next program counter address from the previous clock cycle is not equal to the actual next program counter address, then the instruction cache unit address that is being accessed is not correct and the instruction field being transferred to the processing unit is not correct. Consequently, current instruction cache access is canceled. The actual next program counter address identifies the instruction field that should have been retrieved during this present clock cycle, but instead will be retrieved during the clock cycle following the comparison. This actual next program counter address becomes the current program counter address during the following clock cycle. And this current program counter address becomes the address that is incremented to provide the speculative next program counter address.

In the operative embodiment, the bus coupling the instruction cache unit and the processing unit is two instruction fields wide, i.e., two instruction fields are accessed at the same time. For, this reason, the increment added to the current program counter value to access the next sequential instruction field can be a 1 increment or a 2 increment as shown in the Figures.

Those skilled in the art will readily implement the steps necessary to provide the structures and the methods disclosed herein, and will understand that the process parameters, materials, dimensions, and sequence of steps are given by way of example only and can be varied to achieve the desired structure as well as modifications that are within the scope of the invention. Variations and modifications of the embodiments disclosed herein may be made based on the description set forth herein, without departing from the spirit and scope of the invention as set forth in the following claims.

What is claimed is:

1. A data processing system, comprising:
   an instruction cache unit; and
   a processor coupled to the instruction cache unit, the processor including:
      a program counter, the program counter storing a current address field of an instruction field being accessed in the instruction cache unit during the current clock cycle;
      an incrementing unit for incrementing the current address field stored in the program counter during the current clock cycle, the incrementing unit providing a speculative instruction cache address, the speculative address field used to access the speculative instruction cache address during the next clock cycle;
      a decoder unit responsive to an instruction field accessed during a next previous clock cycle, the decoder unit assisting in providing a actual instruction cache address; and
      a comparison unit responsive the current program counter address and to the actual next program counter address;
         when the current program counter address is equal to the actual next program counter address, applying the speculative next program address to the program counter to determine an address for the next cycle;

when the current program counter address not equal to the actual next program counter address, canceling the instruction cache access occurring during the present clock cycle and applying the actual next program counter address to the program counter to determine an address for the next cycle.

2. The data processing system as recited in claim 1, wherein, when the speculative address field is applied to the program counter, the speculative address field is the current address field during the next clock cycle.

3. The data processing system as recited in claim 1, wherein, when the actual address field is applied to the program counter, the actual address field is the current address field in the next clock cycle.

4. The data processing system as recited in claim 1 wherein no instruction cache access is canceled when the instruction fields in the instruction counter are accessed in sequential order.

5. The data processing system as recited in claim 1 wherein the current address field is incremented by 0, or by 1 or by 2 to generated the speculative address field.

6. A method for a accessing instruction fields stored in an instruction cache unit in a pipelined processor, the method comprising:

accessing an instruction field at a current address field during a first clock cycle;

incrementing the current address field to obtain a speculative address field, the speculative address becoming a new current address during a second clock cycle;

during the second clock cycle, accessing an instruction field at the new current address;

during the second clock cycle, decoding the instruction field accessed during the first clock cycle to assist in obtaining an actual address field;

comparing the new current address field and the actual address field;

when the new current address field and the actual address field are equal, incrementing the new current address to become a new speculative address and accessing the instruction cache unit at the new speculative address field during the third clock cycle; and when the current address field and the actual address field are not equal, canceling the current instruction cache access and, during the third clock cycle, accessing the instruction cache unit using the actual address field.

7. The method as recited in claim 6, wherein, when the new current address field and the actual address field are equal, incrementing the current address field to be a next new current field address in the third clock cycle.

8. The method as recited in claim 6, wherein, when the new current address field and the actual address field are not equal, incrementing the actual address to provide a next new speculative address field.

9. The method as recited in claim 6, wherein the current address field is incremeted by a numeric 1 or a numeric 2 to obtain the speculative address field.

10. The method as recited in claim 6 wherein no instruction cache accesses are canceled when the instruction fields are accessed in sequential order.

11. The method as recited in claim 6 wherein the instruction cache unit is accessed by a program counter.

12. A method for providing a series of instruction fields to a pipelined processor unit, the method comprising:

during a present clock cycle, transferring a current instruction field at a current address to the processing unit and determining a speculative address for a next sequential instruction field during first clock cycle;

during a next clock cycle, transferring the instruction field at the speculative address to the processor unit and decoding the previous instruction field to determine the actual next program address;

comparing the actual address with the current program counter address;

when the actual program counter address equals the current program counter address, the speculative address becomes the current program counter address in the next clock cycle, the instruction field at the current program counter address becomes the current instruction field, and the process continues; and when the actual program counter address is not equal to the current program counter address, the instruction field with current program counter address is canceled, the instruction field at the actual address is transferred to the processor unit during a third clock cycle and becomes the current instruction field, the actual address becomes the current address and the process continues.

13. A method of transferring a sequence of instruction fields from an instruction cache unit to a pipelined processor unit, the method comprising:

decoding an actual address of a next sequential instruction field from a retrieved instruction field while the retrieving a possible instruction field identified by a speculative address;

continuing the transferring of the sequence of instruction fields when the current program counter address equals the actual program counter address; and canceling the possible instruction field and retrieving the instruction field at the actual address.

14. A data processing unit, comprising:

an instruction cache unit storing instruction fields, wherein each instruction field includes a subfield for assisting in the identification of an address of a next sequential instruction;

a processor unit, the processor unit including:
a transfer unit responsive to an applied address for accessing and transferring an instruction field located a the applied address;

an addressing unit for determining a speculative next address based on the previous applied address, the addressing unit applying the speculative address to the transfer unit;

decoding unit responsive to the subfield of a retrieved instruction for assisting in determining an actual address of a next instruction field;

a comparison unit for comparing the actual address with the current program counter address, the comparison unit generating a cancel signal when an actual address identified by a next previous instruction is not equal to the current program counter address of the instruction being retrieved.

* * * * *